United States Patent
Gensert et al.

[19]

[11] Patent Number: 6,042,154
[45] Date of Patent: Mar. 28, 2000

[54] ARRANGEMENT FOR JOINING TUBULAR DUCT SECTIONS

[75] Inventors: Heiko Gensert, Waiblingen; Horst Schneider, Gammelshausen; Arndt Peters, Weinstadt; Helmut Wierzba, Schwabach, all of Germany

[73] Assignees: DaimlerChrysler AG, Stuttgart; Leistritz AG & Co., Fürth, both of Germany

[21] Appl. No.: 08/994,087

[22] Filed: Dec. 19, 1997

[51] Int. Cl.$^7$ ....................................................... F16L 21/04
[52] U.S. Cl. ............................ 285/233; 285/267; 285/319
[58] Field of Search ........................... 285/39, 305, 145.3, 285/146.1, 231, 233, 267, 269, 319, 18, 20

[56] References Cited

U.S. PATENT DOCUMENTS

| | | | |
|---|---|---|---|
| 2,128,720 | 8/1938 | Tweedale | 285/18 |
| 2,365,785 | 12/1944 | Tinnerman | 285/205 X |
| 2,478,127 | 8/1949 | Parker | 285/18 |
| 3,929,357 | 12/1975 | DeVincent et al. | 285/319 |
| 3,951,418 | 4/1976 | Dryer | 285/343 X |
| 4,923,350 | 5/1990 | Hinksman et al. | 285/305 X |
| 5,315,918 | 5/1994 | Pierce | 403/348 X |
| 5,513,882 | 5/1996 | Lewis | 285/305 |

FOREIGN PATENT DOCUMENTS

| | | |
|---|---|---|
| 0 621 432 | 10/1994 | European Pat. Off. . |
| 0 717 225 | 6/1996 | European Pat. Off. . |
| 2 360 028 | 2/1978 | France . |
| 68 12 335 | 12/1968 | Germany . |
| 29 13 561 | 10/1979 | Germany . |
| 88 07 453 | 9/1988 | Germany . |
| 44 44 550 | 6/1996 | Germany . |
| 651 372 | 3/1951 | United Kingdom . |
| 910 578 | 11/1962 | United Kingdom . |
| 1 030 535 | 5/1966 | United Kingdom . |
| 2 087 021 | 5/1982 | United Kingdom . |
| 2 251 664 | 7/1992 | United Kingdom . |
| 2 268 238 | 1/1994 | United Kingdom . |
| WO 96/14535 | 5/1996 | WIPO . |

*Primary Examiner*—Lynne H. Browne
*Attorney, Agent, or Firm*—Klaus T. Bach

[57] ABSTRACT

In an arrangement for joining tubular duct sections, especially the end sections of pipes of a motor vehicle exhaust system, wherein the end sections are received in one another such that one end section extends around the other in spaced relationship with a seal structure disposed therebetween, the one end section has slots and a spring structure is inserted through the slots into the space between the pipe end sections and has spring legs disposed in the space between the pipe end sections in engagement with the pipe end sections for holding them in firm axial engagement with each other and with the seal structure disposed between the pipe end sections.

13 Claims, 5 Drawing Sheets

ARRANGEMENT FOR JOINING TUBULAR DUCT SECTIONS

BACKGROUND OF THE INVENTION

The invention relates to an arrangement for joining tubular duct sections, especially exhaust pipes of exhaust systems in a motor vehicles, wherein an end portion of one pipe is disposed within another pipe in radially spaced relationship such that between the pipe ends, an annular gap is formed in which a seal structure is received.

Pipe joints of this type are used, among others, to uncouple the exhaust system of a motor vehicle's internal combustion engine from the vibrations generated by the engine.

FR 2 360 028 shows such an arrangement wherein, between the two pipe end sections, a spiral compression spring is disposed, which forces the two pipe ends into axial engagement with each other. This known arrangement, however, has the disadvantage that the engine vibrations are uncoupled only insufficiently.

Other joints are for example screw-type joints or plug-in connections wherein the exhaust pipes are inserted into one another and are joined by a clamp. For the uncoupling of vibrations, special uncoupling elements are then required which need to be welded or otherwise connected to the structure.

DE 44 44 550 A1 discloses an arrangement for interconnecting two tubular pipe sections wherein the connection pieces are held in engagement with each other by springs which are pretensioned. The springs include a spring disc which is supported by one of the connection pieces and another disc spring which is operatively connected to the respective other connecting piece, the two disc springs being clamped together under pretension by clamps. Such an arrangement, however, is relatively expensive and, furthermore, requires a relatively large amount of space.

It is therefore the object of the present invention to provide an arrangement for joining tubular ducts wherein an uncoupling of vibrations can be achieved in a simple and cost-efficient manner and which is compact and requires relatively little component space.

SUMMARY OF THE INVENTION

In an arrangement for joining tubular duct sections, especially the end sections of pipes of a motor vehicle exhaust system, wherein the end sections are received in one another such that one end section extends around the other in spaced relationship with a seal structure disposed therebetween, the one end section has slots and a spring structure is inserted through the slots into the space between the pipe end sections and has spring legs disposed in the space between the pipe end sections in engagement with the pipe end sections for holding them in firm axial engagement with each other and with the seal structure disposed between the pipe end sections.

The arrangement for joining tubular duct sections according to the invention has the advantage that the connections can be established easily and are cost-efficient when compared with known solutions. In addition, the arrangement is very compact and requires relatively little installation space. At the same time, it is easy to install since the springs are inserted simply from the outside through the slots. They become effective when they are in place in the space between the two sections to be interconnected. As a result, very little space is required around the pipe sections. By the pretension of the springs, the two pipe sections are uncoupled from a transmission of vibrations and the arrangement permits relative movement between the two pipe sections.

Preferred embodiments of the invention are described below on the basis of the accompanying drawings.

BRIEF DESCRIPTIONS OF THE DRAWINGS

FIG. 1 is a side view of the arrangement for joining tubular ducts according to the invention, FIG. 2 is a side view of the spring structure, FIG. 3 is a front view showing the joining arrangement in principle, FIG. 4 is an axial cross-sectional view of the joining arrangement taken along line 4—4 of FIG. 3, FIG. 5 is an axial cross-sectional view of the joining arrangement shown together with a mounting aid, FIG. 6 is a side view of the joining arrangement with a mounting structure preventing relative rotation of the sections, FIGS. 7 and 8 are enlarged cross-sectional views showing the sealing area of the joining arrangement, and FIG. 9 is a side view of the joining arrangement with two spring legs abutting each other.

DESCRIPTION OF A PREFERRED EMBODIMENT

Figure 1:
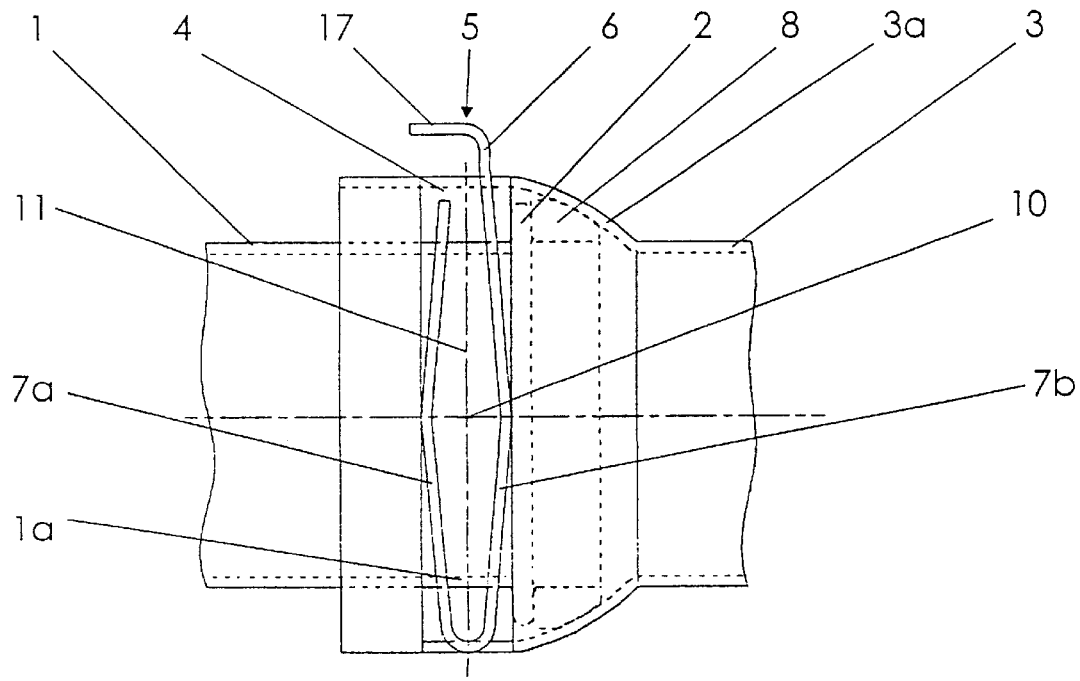

The arrangement described below does not only serve for the interconnection of two pipes such as the exhaust gas pipes of a motor vehicle, but also for the connection of an exhaust pipe to the exhaust stub of an exhaust gas turbocharger.

The arrangement comprises a first pipe 1 with an end section 1a and a flange 2. The flange 2 is disposed at the end section 1a of the pipe 1 and represents a connecting structure. A pipe 3 with an end section 3a forms a pipe connection with the pipe 1. The end section 3a of the pipe 3 has a spherical shape.

The end section 3a of the pipe 3 is provided with two slots 4 formed in the circumferential wall opposite each other. A spring structure 5 is inserted through the two slots. The spring structure 5 has essentially the shape of a U with a base portion 6 and spring legs 7 extending therefrom at a right angle (see FIG. 3).

Figure 2:
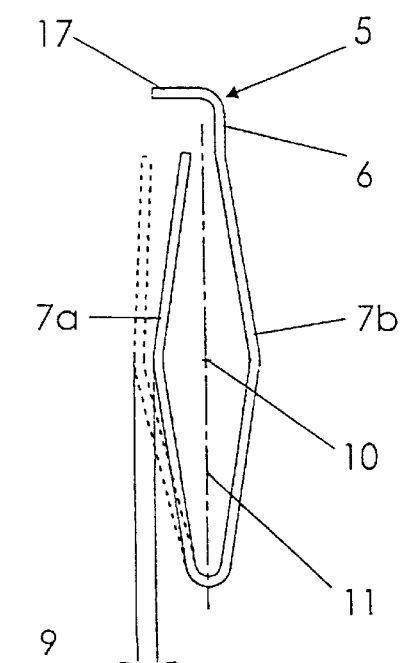

As shown in FIG. 2, each spring leg 7 is formed by two spring leg parts 7a and 7b, which act essentially like leaf springs. The spring legs 7b disposed at opposite sides engage the flange 2 of the pipe 1 whereas the two spring legs 7a engage the wall of the slot 4 facing the pipe 1.

In order to provide for a gas-tight seal, a sealing structure is disposed between the tubes 1 and 3. The sealing structure may be for example, a seal ring 8, which is disposed between the flange 2 and the spherical portion of the end section 3a. It is, of course, also possible that the end section 1a of the pipe 1 has a spherical shape corresponding to the spherical shape of the end section 3a. As shown, the spring leg parts 7b abut one side of the flange 2 and the seal ring 8 is disposed at the opposite side of the flange 2.

FIG. 2 shows the position of the spring leg part 7a in dashed lines in the original state. As can be seen, the spring which, when compressed is in the position as shown in full lines provides for a spring travel distance 9. The amount of the pretension force generated with the insertion of the spring depends on the spring travel distance 9 of the spring structure 5 between a relaxed position of the spring legs 7a and the position of the spring leg 7a when the spring 7 is installed. By way of the spring travel distance 9, it is also possible to compensate for the manufacturing tolerances of the components.

In order to make sure that the spring structure 5 is properly disposed in the slot 4 and, consequently relative pivoting between the two pipes is possible, which is important for the vibration uncoupling of the two pipes, the spring structure 5 needs to be cylindrical in the area of the spring legs 7a and 7b. By shaping the end section 3a in the form of a sphere, there is provided a sphere center point 10 for the pivot movements. The spring structure 5 has a longitudinal center axis 11, which extends through the center point 10 of the sphere. The two spring legs 7a and 7b engage the wall of the slot 4 and the flange 2 respectively at their areas of greatest distance from one another. With the arrangement as described above, it is made sure that the spring structure 5 can accommodate relative movements of pipe 3 about the sphere center point 10. In other words, the pivot axis of the spring structure 5 is identical with the pivot axis of the pipe end section 3a, that is, the pivot axis which extends through the sphere center point 10 normal to the pipe axis.

Figure 4:
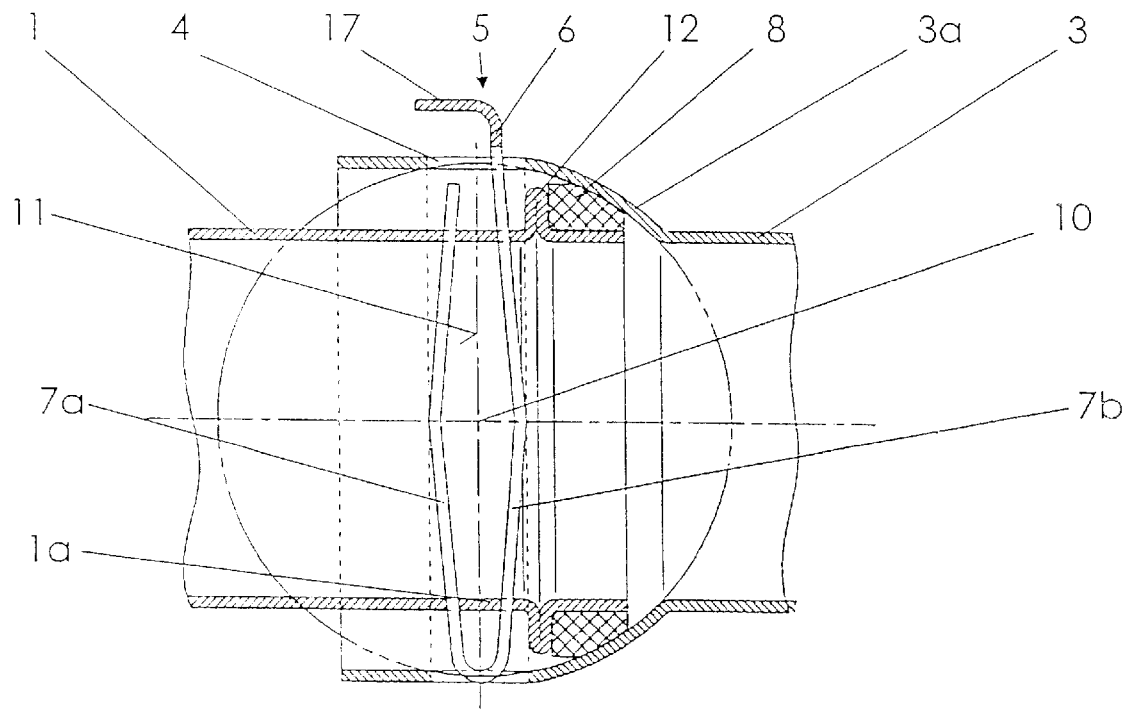

The embodiment as shown in FIG. 4 is essentially the same pipe joint design as that shown in FIG. 1. The only difference is that the flange is not mounted on the pipe end section 1a, but is provided by a radial projection 12 formed from the pipe end section 1a by folding.

Figure 5:
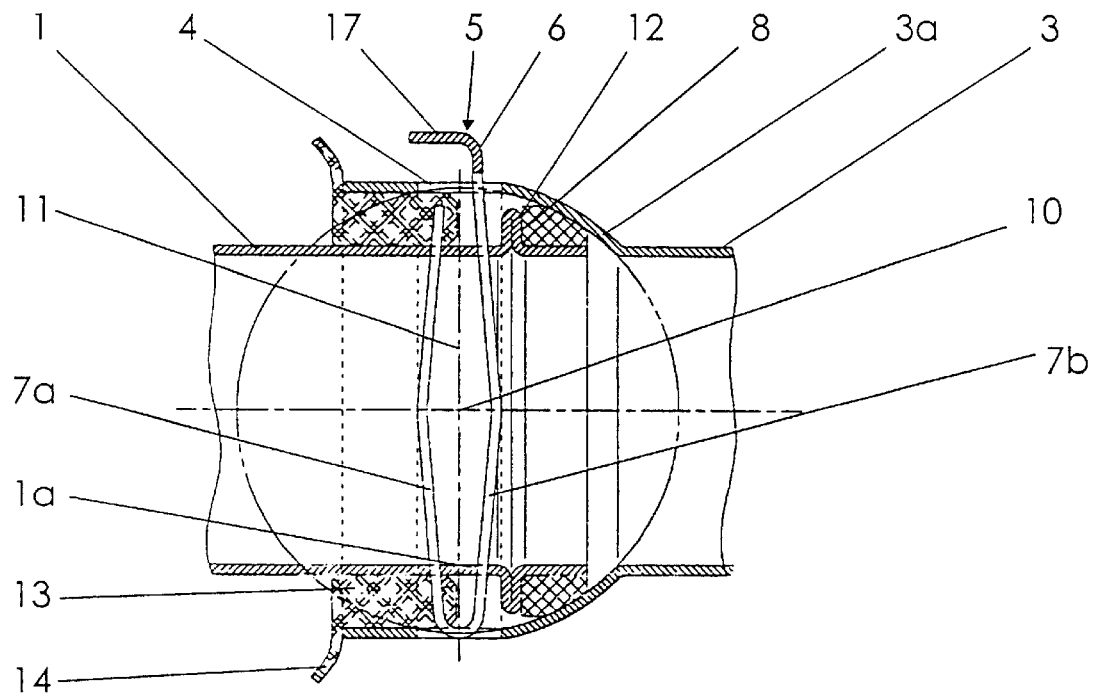

FIG. 5 shows the arrangement with a mounting aid. In order to prevent kinking of the two pipes 1 and 3 during assembly in a vehicle, two cylindrical semi-sleeves 13 preferably of plastic are inserted between the pipe 1 and the end section 3a of the pipe 3. With the semi-sleeves 13 inserted between the pipe 1 and the end section 3a of the pipe 3, the spring structure can be installed more easily and more accurately.

After mounting, the two semi-sleeves 13 are removed by their ears 14 and can then be reused. With this simple mounting aid, no additional support or auxiliary components are needed for the installation.

Figure 6:
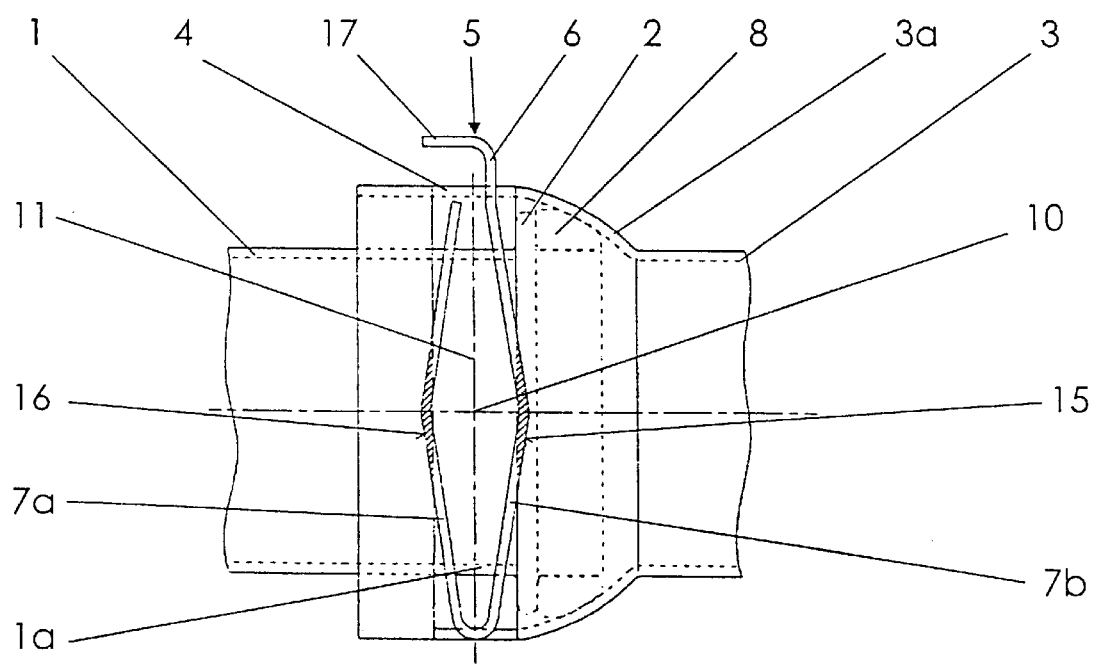

If relative rotation between the two pipes is to be prevented, the spring structure 5 is to be fixed relative to the two pipes. Such an arrangement is shown in FIG. 6. In this arrangement, the flange 2 or, respectively, the projection 12 includes in the area of engagement with the spring structure 5 an axial recess 15. The same is provided in the wall of the slot 4 with which the spring leg 7a is engaged. Here, the slot wall is provided in the area in which it is engaged by the spring structure 5, with a recess 16 which is formed by an indentation or inclinations—in a vertical section. In this way, the two spring legs 7a and 7b engage the flange 2, 12 and the wall of the slot 4 in areas where the spring structures are expanded into the recesses 15 and 16 so that the pipes are held in their predetermined angular positions relative to each other and in proper axial alignment.

The spring structure 5 as shown in the figures consists of a single-layer spring steel. However, the spring structure may consist of a multi-layer spring steel by which the properties of the spring structure 5 can be better adjusted to the requirements, particularly to provide various pretensioning forces. It is also possible to provide a bi-metallic spring structure. In this way, the properties of the spring structure for joining the pipe are temperature-dependent and the vibration uncoupling can be optimized with respect to several areas.

Figure 3:
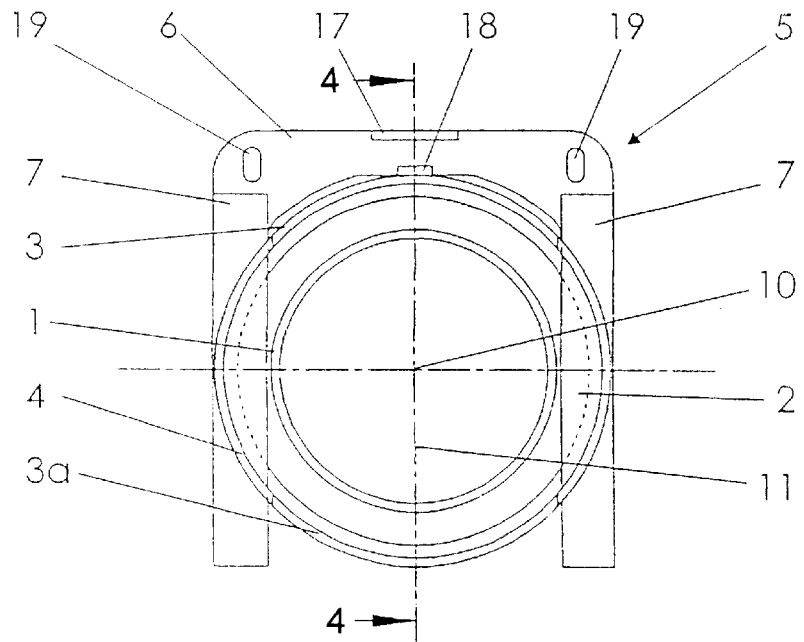

In order to further facilitate the mounting, the spring structure 5 may include a tongue 17 extending from its base body 6. The force required for the insertion of the spring structure 5 can then be applied to the tongue 17. In order to facilitate disassembly, the spring structure 5 is provided in the area of the base body 6 with one or several openings or recesses 18 and 19. As shown in FIG. 3, the recess 18 is disposed in the center area of the spring structure 5. If a screw driver is inserted into the recess 18, the spring structure 5 can be pulled out of the slots 4 by a lever force applied with the screw driver. Instead of a central recess 18, there may be provided the two openings 19 arranged at opposite sides of the spring structure 5. A hook-like tool may be inserted into the openings 19, whereby the spring structure can then be pulled out of the slots 4. Of course, the spring structure 5 may be provided with both, the central recess 18 and the openings 19 arranged at opposite sides.

Figure 7:
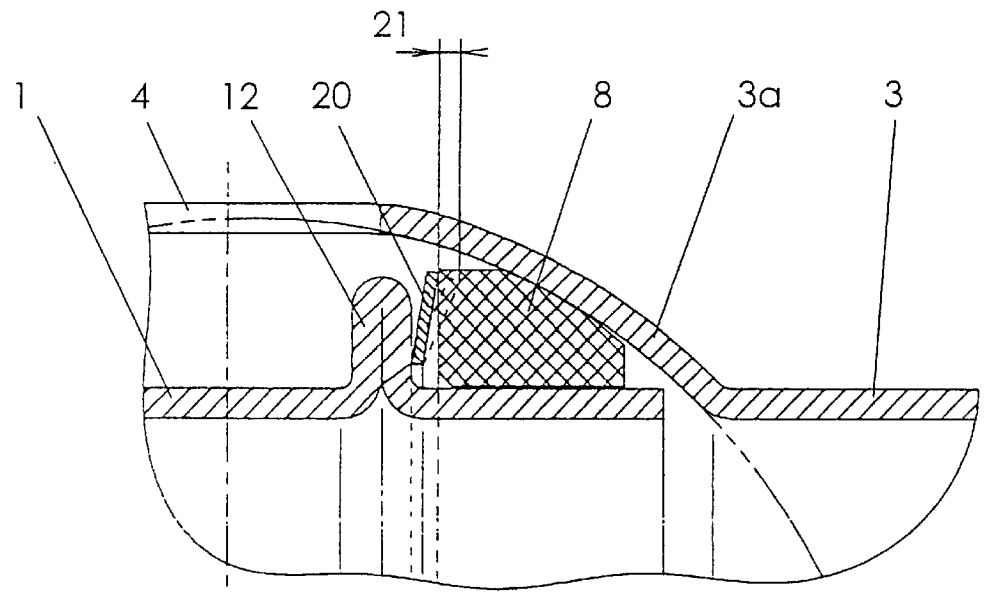
Figure 8:
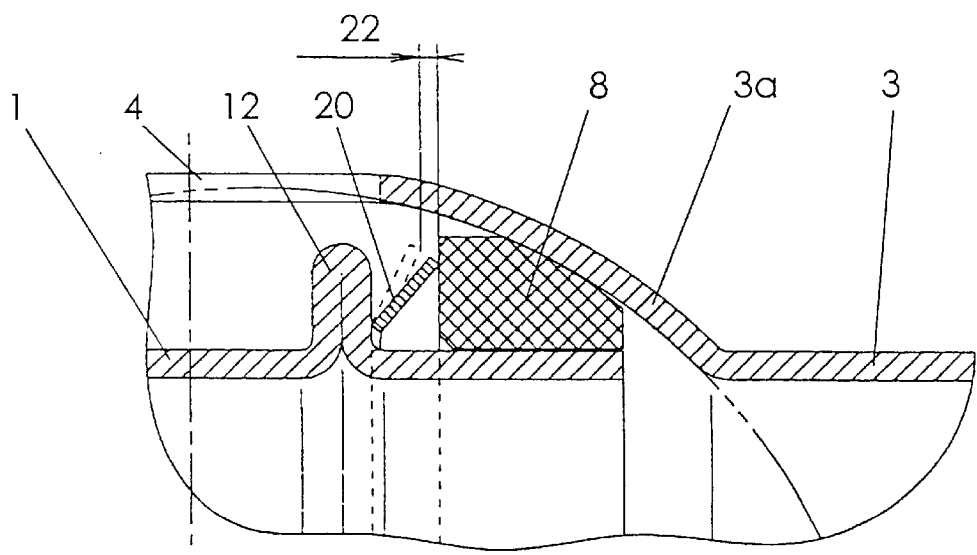

If axial movements of the pipes 1 and 3 relative to each other are to be accommodated, a Belleville type spring structure 20 may be provided. Such an arrangement is shown in FIGS. 7 and 8. The Belleville type spring structure 20 is disposed between the seal ring 8 and the flange 2 or, respectively, the projection 12 of the pipe 1.

FIG. 7 shows the Belleville type spring in its normal position. The axial distance that can be accommodated by the Belleville spring structure 20 when subjected to forces is indicated by the numeral 21. In its normal position, the Belleville spring structure 20 is pretensioned. With the Belleville type spring structure 20, the flange 12 of the pipe 1 (FIG. 8) can move toward, or away from, the seal ring 8 depending on the load forces effective thereon (tension or pressure load). Under such conditions, the Belleville type spring structure 20 also changes its position. This can be seen by a comparison of the two FIGS. 7 and 8. In FIG. 8, the numeral 22 indicates the axial travel distance of the spring 20 with the application of tension forces.

In any case, however, a sealing fit of the joint is insured since the Belleville-type spring structure 20 is always in line contact with the seal ring 8 and also with the flange 2 of the pipe 1. As a result, exhaust gas cannot escape from the space formed below the Belleville-type spring structure 20, that is, between the spring structure 20 and the end section of the pipe 1. The exhaust gas volume which may reach this space is furthermore only very small since there is only a small gap between the seal ring 8 and the pipe 1 resulting from manufacturing clearances.

To show the arrangement in greater detail, FIGS. 7 and 8 are enlarged sectional views showing the pipe joint without the spring structure 5. Furthermore, the possible axial travel distances of the seal ring 8 are exaggerated. The axial movements are in the range of 1 to 2 mm.

Figure 9:
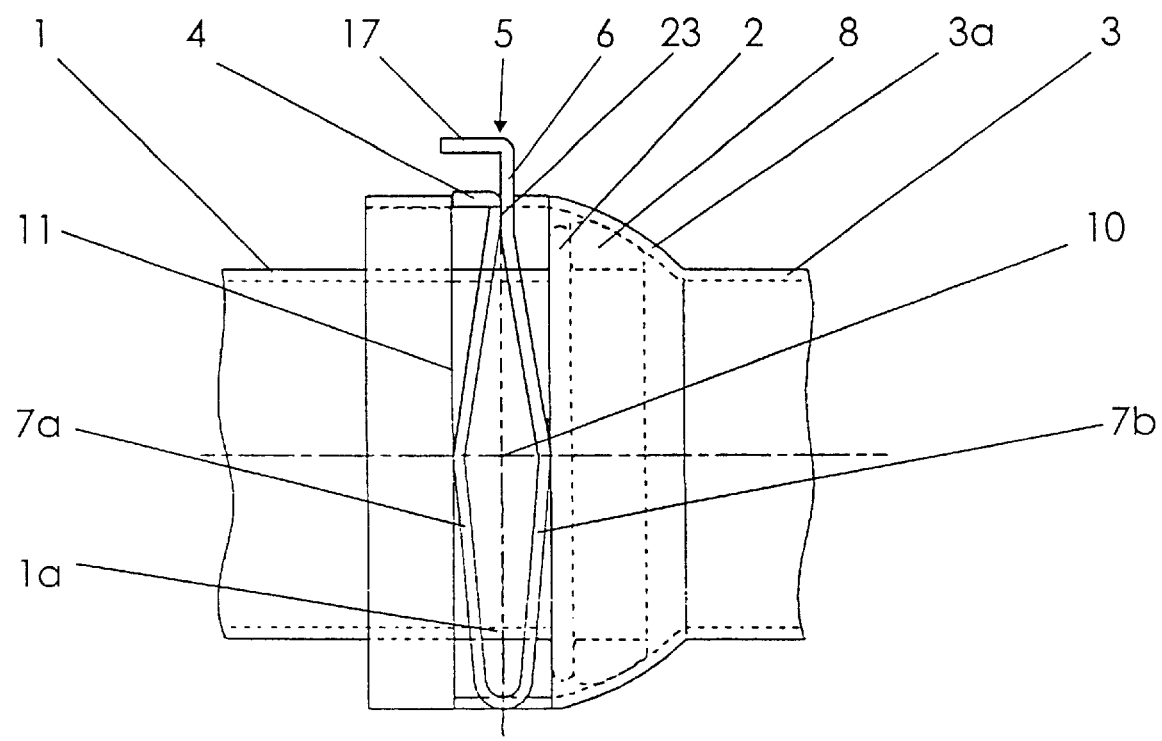

FIG. 9 shows an embodiment of the pipe joint arrangement, wherein the two spring legs 7a and 7b of the spring structure 5 are engaged with one another at their upper ends that is, at their ends opposite the U bent end. The engagement area is indicated by the numeral "23". Such an arrangement has the advantage that the two upper halves of the spring legs 7a and 7b contribute to providing the spring force desired. In this way, the spring force generated by the spring structure can be doubled with an otherwise unchanged geometry of the arrangement.

In the engagement area 23, the two spring legs may be firmly attached to each other, for example, by welding, riveting, clamping, screwing or by another engagement means or they may be freely sliding on one another. If the two legs are freely sliding on one another, squeaking noises may be generated by the relative movement. To prevent such noises, a non-metallic slide surface may be provided on one or both of the spring legs 7*a* and 7*b*. Also, an intermediate slide plate may be disposed between the two spring legs in the engagement area 23.

What is claimed is:

1. An arrangement for joining two end sections of pipes of an exhaust system of a motor vehicle, said end sections being received within one another such that one end section extends around the other in radially spaced relationship so as to form an annular space therebetween, said one end section having at least two slots, a seal ring disposed in the space between said end sections and a spring structure inserted into said slots and having at least two spring legs including each two spring leg parts arranged spaced from each other in an axial direction of said pipe sections disposed at opposite sides in engagement with said one and, respectively, said other pipe end section and each of said pipe end sections having radially extending stop structures engaged by said spring leg parts so as to hold said pipe end sections resiliently in firm axial engagement with each other and with said seal structure.

2. An arrangement according to claim 1, wherein said spring structure is essentially U-shaped including a web having spaced legs forming said spring legs which extend into said slots in said one end section, said spring legs abutting a wall of said slots at one side and, at the other side, a radial flange structure projecting from the other pipe end section.

3. An arrangement according to claim 2, wherein said radial flange structure is a flange mounted on said other pipe end section.

4. An arrangement according to claim 2, wherein said radial flange structure is a radial projection formed from said other pipe end section by folding.

5. An arrangement according to claim 2, wherein said seal ring is disposed at the side of said flange structure remote from said spring structure.

6. An arrangement according to claim 5, wherein said seal ring includes a spherical seal surface area in engagement with said one pipe end section and wherein a Belleville-type spring structure is disposed between said radial flange structure and said seal ring.

7. An arrangement according to claim 2, wherein said spring structure is provided at one end with a tongue extending from the spring structure in an axial direction of said pipe sections.

8. An arrangement according to claim 2, wherein each of said spring legs includes a first leg portion extending from said web and a bent-over second leg portion disposed adjacent said first leg portion in spaced relationship therefrom and having a free end disposed in engagement with said first leg portion at the end remote from the bent over end thereof.

9. An arrangement according to claim 1, wherein at least one of said pipe end sections is provided with an axial recess receiving a portion of said spring structure for firmly retaining said spring structure in proper position between said pipe end sections.

10. An arrangement according to claim 9, wherein said axial recess is formed in said radial flange structure.

11. An arrangement according to claim 9, wherein said axial recess is formed in a wall defining said slot.

12. An arrangement according to claim 1, wherein said spring structure includes cut-outs at one end to facilitate removal of the spring structure.

13. An arrangement according to claim 1, wherein two semi-cylindrical sleeve portions are provided for insertion between said pipe end sections to facilitate mounting of said spring structure.

* * * * *